(12) United States Patent
Krammer et al.

(10) Patent No.: US 11,908,616 B2
(45) Date of Patent: Feb. 20, 2024

(54) COIL UNIT FOR INDUCTIVELY CHARGING A VEHICLE

(71) Applicant: Bayerische Motoren Werke Aktiengesellschaft, Munich (DE)

(72) Inventors: Josef Krammer, Holzkirchen (DE); Florian Niedermeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 806 days.

(21) Appl. No.: 16/375,970

(22) Filed: Apr. 5, 2019

(65) Prior Publication Data

US 2019/0237248 A1 Aug. 1, 2019

Related U.S. Application Data

(63) Continuation of application No. PCT/EP2017/075175, filed on Oct. 4, 2017.

(30) Foreign Application Priority Data

Oct. 7, 2016 (DE) ..................... 10 2016 219 491.7

(51) Int. Cl.
*H01F 38/14* (2006.01)
*H01F 27/38* (2006.01)
(Continued)

(52) U.S. Cl.
CPC .............. *H01F 38/14* (2013.01); *B60L 53/12* (2019.02); *B60L 53/30* (2019.02); *B60L 53/31* (2019.02);
(Continued)

(58) Field of Classification Search
CPC ........ H01F 38/14; H01F 27/24; H01F 27/255; H01F 27/38; B60L 53/12; B60L 53/30;
(Continued)

(56) References Cited

U.S. PATENT DOCUMENTS 5,162,739 A * 11/1992 Doty .................. G01R 33/3635
324/322
5,821,638 A * 10/1998 Boys ....................... H02J 50/40
307/104
(Continued)

FOREIGN PATENT DOCUMENTS

CN 103259345 A * 8/2013
CN 103608878 A 2/2014
(Continued)

OTHER PUBLICATIONS

International Search Report (PCT/ISA/210) issued in PCT Application No. PCT/EP2017/075175 dated Dec. 5, 2017 with English translation (seven (7) pages).
(Continued)

*Primary Examiner* — Carlos Amaya
(74) *Attorney, Agent, or Firm* — Crowell & Moring LLP (57) ABSTRACT

A coil unit for inductively charging a vehicle is provided. The coil unit includes a coil, wherein the coil includes multiple windings of at least two electric lines. The electric lines are connected in parallel. Each of the electric lines has a respective winding part, in which the windings are formed, and an additional part, in which an additional inductor unit having a predefined electric inductance is arranged.

7 Claims, 6 Drawing Sheets

(51) Int. Cl.
  *B60L 53/12* (2019.01)
  *H01F 27/255* (2006.01)
  *B60L 53/30* (2019.01)
  *B60L 53/31* (2019.01)
  *H01F 27/24* (2006.01)

(52) U.S. Cl.
  CPC ............ *H01F 27/24* (2013.01); *H01F 27/255* (2013.01); *H01F 27/38* (2013.01); *Y02T 10/70* (2013.01); *Y02T 10/7072* (2013.01); *Y02T 90/12* (2013.01); *Y02T 90/14* (2013.01)

(58) Field of Classification Search
  CPC .......... B60L 53/31; H02J 7/025; Y02T 10/70; Y02T 10/7072; Y02T 90/12; Y02T 90/14
  See application file for complete search history.

(56) References Cited

U.S. PATENT DOCUMENTS

| | | | | |
|---|---|---|---|---|
| 6,239,664 | B1* | 5/2001 | Northam | H03B 5/326 331/177 V |
| 9,852,838 | B2* | 12/2017 | Winkler | H01Q 7/08 |
| 2003/0201859 | A1 | 10/2003 | Ichikawa | |
| 2006/0017438 | A1* | 1/2006 | Mullen | G01R 33/3635 324/318 |
| 2008/0042650 | A1* | 2/2008 | McDowell | G01R 33/34 324/318 |
| 2008/0116847 | A1* | 5/2008 | Loke | H02J 50/70 320/108 |
| 2010/0225315 | A1* | 9/2010 | McDowell | G01R 33/3628 324/318 |
| 2012/0025605 | A1* | 2/2012 | Schneider | H01F 27/38 307/9.1 |
| 2012/0086281 | A1* | 4/2012 | Kanno | H01Q 1/248 307/104 |
| 2013/0093252 | A1* | 4/2013 | Norconk | H02J 50/12 307/104 |
| 2014/0060505 | A1 | 3/2014 | Khan et al. | |
| 2014/0104025 | A1 | 4/2014 | Honna et al. | |
| 2014/0125142 | A1* | 5/2014 | Kanno | H02J 50/12 307/104 |
| 2014/0143933 | A1* | 5/2014 | Low | H02J 50/10 320/108 |
| 2015/0054350 | A1 | 2/2015 | Covic et al. | |
| 2015/0123486 | A1 | 5/2015 | Abe et al. | |
| 2016/0121731 | A1 | 5/2016 | Matsumoto et al. | |
| 2017/0036553 | A1* | 2/2017 | Krammer | B60L 53/305 |
| 2017/0264130 | A1* | 9/2017 | Lethellier | H02J 7/025 |

FOREIGN PATENT DOCUMENTS

| | | | | |
|---|---|---|---|---|
| CN | 103683525 A | | 3/2014 | |
| CN | 104756357 A | | 7/2015 | |
| DE | 4437560 A1 | * | 5/1996 | ............ H02M 1/14 |
| DE | 10 2009 013 103 A1 | | 10/2010 | |
| DE | 10 2013 001 240 A1 | | 7/2014 | |
| DE | 10 2013 013 905 A1 | | 2/2015 | |
| WO | WO 2014/207267 A1 | | 12/2014 | |
| WO | WO-2015024901 A1 | * | 2/2015 | ......... H01F 27/2847 |
| WO | WO-2016048008 A1 | * | 3/2016 | ............ G12B 17/02 |

OTHER PUBLICATIONS

German-language Written Opinion (PCT/ISA/237) issued in PCT Application No. PCT/EP2017/075175 dated Dec. 5, 2017 (five (5) pages).

German-language Search Report issued in counterpart German Application No. 10 2016 219 491.7 dated Aug. 2, 2017 with partial English translation (17 pages).

Chinese-language Office Action issued in Chinese Application No. 201780061343.0 dated Oct. 8, 2021 with English translation (16 pages).

Chinese-language Office Action issued in Chinese Application No. 201780061343.0 dated Mar. 3, 2022 with English translation (18 pages).

* cited by examiner

COIL UNIT FOR INDUCTIVELY CHARGING A VEHICLE

CROSS REFERENCE TO RELATED APPLICATIONS

This application is a continuation of PCT International Application No. PCT/EP2017/075175, filed Oct. 4, 2017, which claims priority under 35 U.S.C. § 119 from German Patent Application No. 10 2016 219 491.7, filed Oct. 7, 2016, the entire disclosures of which are herein expressly incorporated by reference.

BACKGROUND AND SUMMARY OF THE INVENTION

The invention relates to a coil unit for inductively charging a vehicle.

Many modern vehicles are hybrid vehicles or electric vehicles. Precisely such vehicles often have electrical energy stores with a high charging capacity. To simplify a charging procedure of the electrical energy stores, it is advantageous if the electrical energy stores are able to be charged wirelessly An object on which the invention is based is to provide a coil unit for inductively charging a vehicle, which coil unit is very efficient.

This and other objects are achieved by a coil unit in accordance with embodiments of the invention.

The invention is distinguished by a coil unit for inductively charging a vehicle. The coil unit includes a coil, wherein the coil includes a plurality of windings of at least two electrical lines. The electrical lines are connected in parallel. Each of the electrical lines has a respective winding part in which the windings are formed and an additional part in which an additional inductance unit is arranged that has a prescribed electrical inductance.

The coil unit is arranged for example in or on the vehicle and the coil is what is known as a secondary coil. As an alternative, the coil unit is arranged for example outside the vehicle and the coil is what is known as a primary coil.

Due to the number of at least two electrical lines, a high current-carrying capacity is able to be achieved since the current is distributed over the parallel electrical lines. The additional inductance unit may contribute to the current being distributed evenly over the parallel electrical lines. The number of electrical lines is in principle able to be selected freely, and as many electrical lines as desired may therefore be used in order to achieve a high current-carrying capacity.

The electrical lines are in particular HF litz wires. An HF litz wire, also called high-frequency litz wire, is a litz wire that includes a relatively high number of wires that are insulated from one another. The wires are in particular intertwined such that on average each individual wire as far as possible adopts each position in the overall cross section of the litz wire with the same frequency. As a result, the litz wire has a very high number of conductive surfaces, such that high efficiency is able to be achieved in spite of the skin effect.

According to a refinement, the additional inductance unit has an electrical inductance that corresponds to at least 0.02 times the electrical inductance of the respective electrical line in the winding part.

The smaller the electrical inductance of the additional inductance unit, the lower its effect on system parameters of the coil unit. However, a larger additional inductance unit may possibly contribute more accurately to the current being distributed evenly over the parallel electrical lines. Therefore, a size of at least 0.02 times the electrical inductance of the respective electrical line in the winding part is a good compromise. The respective additional inductance unit has for example an electrical inductance that is in a region of 0.02 times to 0.1 times the electrical inductance of the respective electrical line in the winding part. By way of example, the electrical inductance of the additional inductance unit corresponds to 0.02 times, 0.04 times, 0.06 times, 0.08 times or 0.1 times the electrical inductance of the respective electrical line in the winding part.

According to a further refinement, the number of electrical lines is two and the additional inductance units of the two electrical lines are oppositely coupled.

By virtue of the opposite coupling of the additional inductance units of the two electrical lines, the overall impedance of the coil is not changed by the additional inductance units. The opposite coupling may be achieved for example by forming the two additional inductance units by way of two coils that have a common ferrite and that are oppositely wound.

According to a further refinement, the additional inductance unit is formed as a separate component.

As a result, the manufacture of the coil unit is simplified since the additional inductance unit is able to be added in a separate manufacturing step.

According to a further refinement, the additional inductance unit is formed by winding the respective electrical line so as to form an additional coil.

As a result, the additional inductance unit is able to be formed in a very simple and inexpensive manner.

According to a further refinement, the additional coils of the electrical lines are wound around a common ferrite.

As a result, coupling of the additional coils is able to be achieved in a very simple manner.

According to a further optional refinement, the coil unit additionally has a carrier body that has a number of ferrites that corresponds to the number of electrical lines. A magnetically neutral carrier is in each case arranged between the ferrites. The additional coils of the electrical lines are each wound around the ferrites of the carrier body.

As a result, decoupling of the additional coils is able to be achieved in a very simple manner.

According to a further refinement, the number of electrical lines is two. The electrical inductances of the additional inductance units are prescribed such that it holds true that $L\_S1+L1=L\_S2+L2$. L1 is the inductance of a first of the two additional inductance units. L2 is the inductance of a second of the two additional inductance units. $L\_S1$ is the inductance in the winding part of the electrical line that has the first additional inductance unit. $L\_S2$ is the inductance in the winding part of the electrical line that has the second additional inductance unit.

The two electrical lines often have different lengths in the winding part and therefore different diameters in the winding part, in particular in the case of a planar winding. Since, in the case of a planar winding, one of the two electrical lines always runs on the outer side, this has a greater inductance and, due to the longer path, a greater resistance. If the electrical inductances of the additional inductance units are prescribed such that it holds true that $L\_S1+L1=L\_S2+L2$, such asymmetry is able to be compensated.

Other objects, advantages and novel features of the present invention will become apparent from the following detailed description of one or more preferred embodiments when considered in conjunction with the accompanying drawings.

DETAILED DESCRIPTION OF THE DRAWINGS

Elements having the same structure or function are referenced using the same reference signs throughout the figures.

Figure 1:
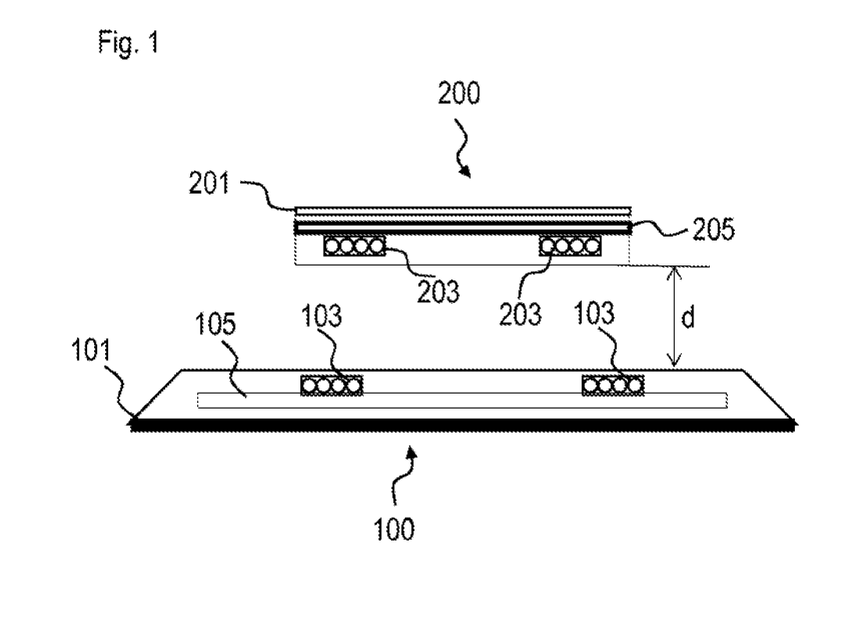
FIG. 1 is a view of a structure of an inductive charging system.

FIG. 1 shows a structure of an inductive charging system. The charging system includes a ground unit 100 and a vehicle unit 200 that is connected to a vehicle battery.

The ground unit 100 includes a housing 101, a primary coil 103 and a ferrite 105.

The vehicle unit 200 likewise includes a housing 201, a secondary coil 203 and a ferrite 205.

In a charging procedure, the vehicle unit 200 is arranged at a distance d above the ground unit 100.

Figure 2:
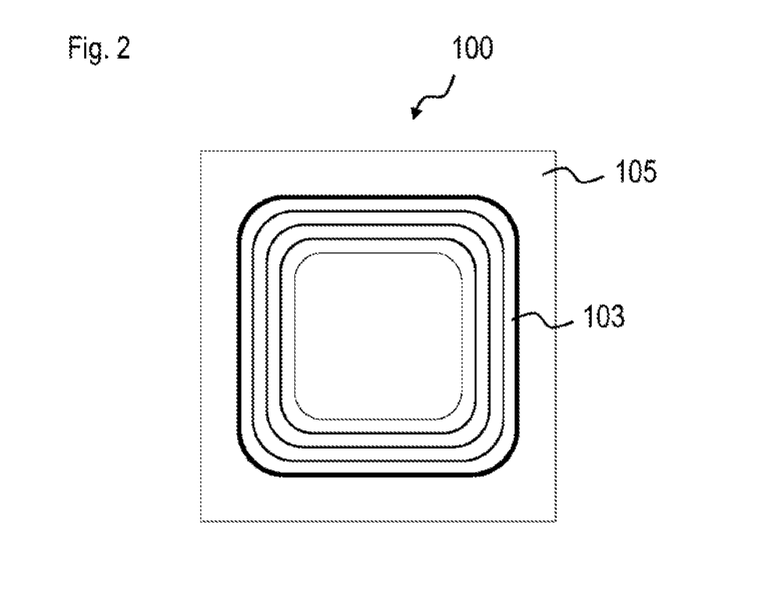
FIG. 2 is a plan view of a ground unit.

FIG. 2 shows a plan view of the ground unit 100. As may be seen, the primary coil 103 is situated on the ferrite 105.

Figure 3:
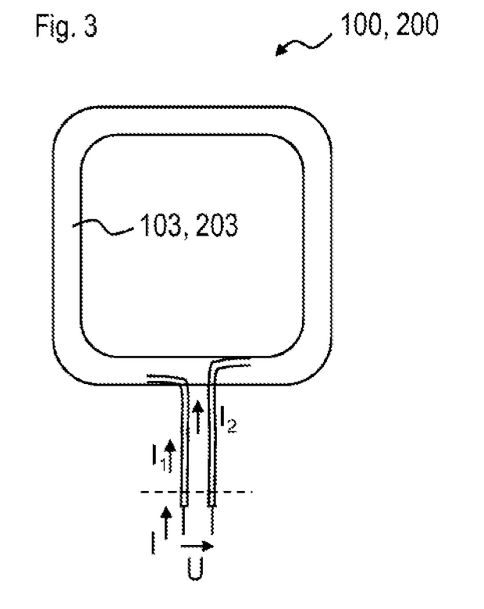
FIG. 3 is a view of one refinement of a primary coil or secondary coil.
Figure 4:
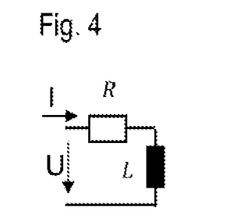
FIG. 4 is a view of a coil model.

FIG. 3 shows one refinement of the primary coil 103 or secondary coil 203. The refinement of the primary coil 103 or secondary coil 203 includes a plurality of windings of two electrical lines, the electrical lines being connected in parallel. The windings are in particular configured such that the two electrical lines lie as close as possible to one another and possibly even cross so as to create conditions that are as equal as possible for the electrical lines If a model, as shown in FIG. 4, which includes a resistance R and inductance L, is taken for one of the electrical lines, then the substitute model shown in FIG. 5 results for the refinement of FIG. 3. The two windings may be interpreted as a transformer. Due to the winding type, an approximately equal inductance and a coupling factor very close to 1 results for both windings. The two electrical lines are connected to a terminal.

Figure 5:
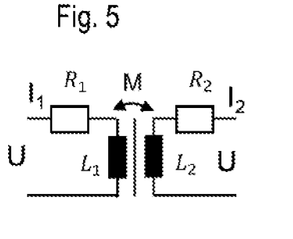
FIG. 5 is a view of a substitute model.

The following equations result from the substitute model, under the assumption that $k \cong 1$, $\Delta L_{1/2} \cong 0$, $R_{1/2} \cong 0$, $M = k\sqrt{L_1 L_2} = kL = L$, k is in this case the coupling factor, $L_1$ is the inductance of the winding of a first of the two electrical lines, $L_2$ is the inductance of the winding of a second of the two electrical lines, $R_1$ is the line resistance of the first electrical line and $R_2$ is the line resistance of the second electrical line:

$$\begin{bmatrix} U_1 \\ U_1 \end{bmatrix} = Z \begin{bmatrix} I_1 \\ I_2 \end{bmatrix} \tag{1}$$

$$Z = \begin{bmatrix} L_1 + R_1 & M \\ M & L_2 + R_2 \end{bmatrix} \tag{2}$$

$$Z = \begin{bmatrix} L + \Delta L_1 + R_1 & M \\ M & L + \Delta L_2 + R_2 \end{bmatrix} \cong \begin{bmatrix} L & L \\ L & L \end{bmatrix} \tag{3}$$

For the sake of simplicity, "L" is written in place of "jwL".

This gives the following:

$$\begin{bmatrix} L & L \\ L & L \end{bmatrix} \begin{bmatrix} I_1 \\ I_2 \end{bmatrix} = \begin{bmatrix} U_1 \\ U_2 \end{bmatrix} \tag{4}$$

wherein $U_1 = U_2 = U$ and $I_1 + I_2 = I$.

As may be seen, there are infinite solutions for the equation system (4). In practice, this means that the current may be divided in any way between the two windings. This is illustrated in more detail with reference to FIGS. 6 and 7.

Figure 6:
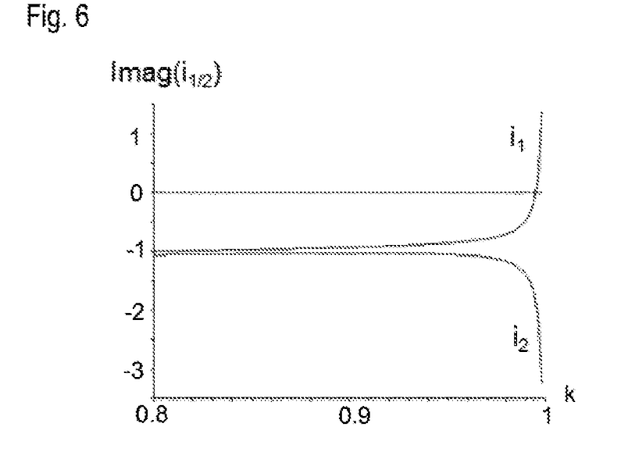
FIG. 6 is a graph of an imaginary part of currents plotted against a coupling factor.

FIG. 6 shows the imaginary part of the currents $I_1$, $I_2$ depending on the coupling factor k, under the assumption that $\Delta L_1 = 1$ uH, $L1 = 101$ uH, $L_2 = 100$ uH, $U1 = U2 = 100$ V, $R1 = R2 = 0$ ohm.

If the coupling factor k approaches 1, then the currents run in opposite directions and the individual coil currents exceed the overall current.

Figure 7:
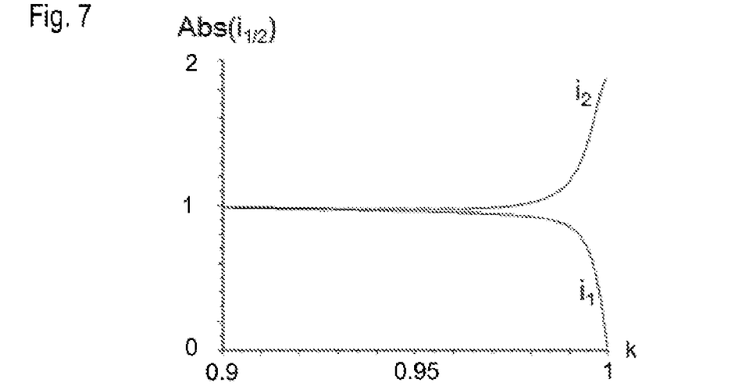
FIG. 7 is a graph of magnitudes of an absolute part of currents plotted against a coupling factor.

FIG. 7 shows the absolute part of the currents $I_1$, $I_2$ depending on the coupling factor k, under the assumption that $\Delta R_1 = 0.5$ ohm, $L1 = L2 = 100$ uH, $L2 = 100$ uH, $U1 = U2 = 100$ V, $R1 = 0.5$ ohm, $R2 = 0$ ohm.

If the coupling factor k approaches 1, then the current flows only through one conductor.

This shows that parallel coil windings react in a manner highly sensitive to the deviation of individual parameters. The unequal flow of current rises to a very great extent at a coupling factor close to 1, for example at k>~0.99. Even in the case of small differences in resistance, the flow of current may be concentrated on one conductor. Different inductances may have even more extreme effects. In this case, the current in one of the electrical conductors 5,7 may even reverse, such that a multiple of the necessary current flows in another of the electrical conductors 5,7. Since in practice the individual electrical conductors 5,7 always exhibit differences, an electrical conductor is for example closer to a ferrite, a parallel connection is only efficient with a great deal of expenditure, since the exact layout of the windings is planned extremely accurately.

Figure 8:
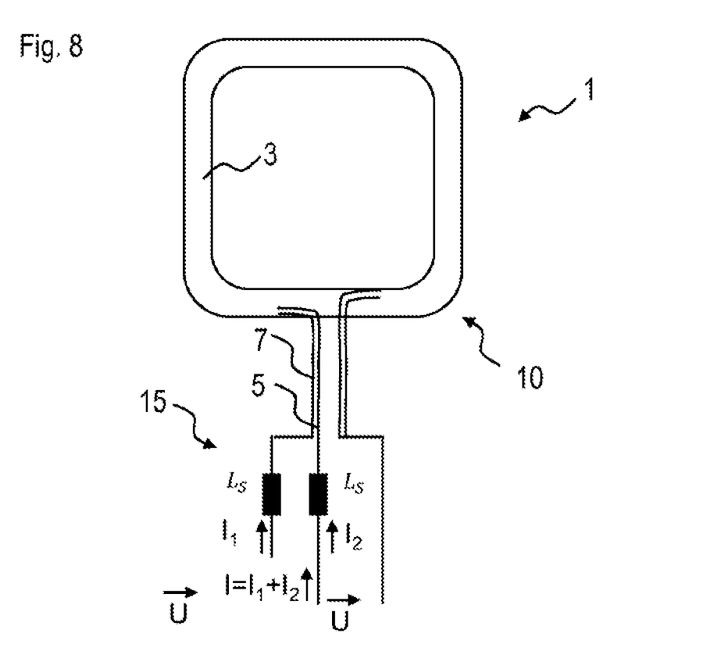
FIG. 8 is a view of a coil unit for inductively charging a vehicle.

FIG. 8 shows a coil unit 1 for inductively charging a vehicle. The coil unit 1 includes a coil 3. The coil 3 may for example be the primary coil 103 of the ground unit 100. In this case, the coil unit 1 is for example the ground unit 100. As an alternative, the coil 3 may be for example the secondary coil 203 of the vehicle unit 200. In this case, the coil unit 1 is for example the vehicle unit 200.

The coil 3 includes a plurality of windings of at least two electrical lines 5,7. Each of the electrical lines 5,7 has a respective winding part 10 in which the windings are formed and an additional part 15 in which an additional inductance unit $L_S$ is arranged that has a prescribed electrical inductance.

The electrical lines 5,7 are connected in parallel. To this end, the two electrical lines 5,7 are for example connected to a terminal.

Figure 9:
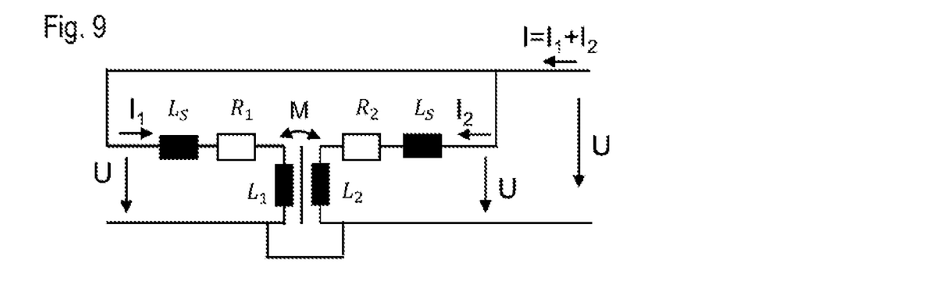
FIG. 9 is a view of a substitute model of the coil unit for inductively charging a vehicle.

If the number of electrical lines 5,7 is two, this gives the substitute model of FIG. 9. The following equation results from the substitute model:

$$Z = \begin{bmatrix} L_1 + L_S + R_1 & M \\ M & L_2 + L_S + R_2 \end{bmatrix} \quad (5)$$

Under the assumption that $L=L_1=L_2=M(k=1)$ and $R=R_1=R_2$, this gives:

$$Z = \begin{bmatrix} L + L_S + R_1 & L \\ L & L + L_S + R_2 \end{bmatrix} \quad (6)$$

and with $L_A=(L_1+L_S)$, $L=L_1=L_2$ $$M_A = k_A\sqrt{(L_1-L_S)(L_2+L_S)} = k_A(L+L_S) = L \quad (7)$$

This results in the following coupling:

$$k_A = \frac{L}{L + L_S} \quad (8)$$

The coupling is thus reduced depending on the size of $L_S$. When $L_S \geq 0.02$ L, a critical range (cf. FIGS. 6 and 7) is avoided since the coupling $k_A$ is then always less than 0.99.

The overall impedance of the coil changes due to the additional inductances. The overall impedance is given by solving the above equation systems with a Z-matrix. For $L=L_1=L_2=M(k=1)$, $R=R_1=R_2$, the following results:

$$Z_{res} = L + R/2 + L_S/2 \quad (9)$$

As may be seen, the overall resistance R is reduced by the parallel connection. At the same time, the overall inductance $L+L_S/2$ increases, but only by the value $L_S/2$. The reactive power in the system thus rises slightly.

Figure 10:
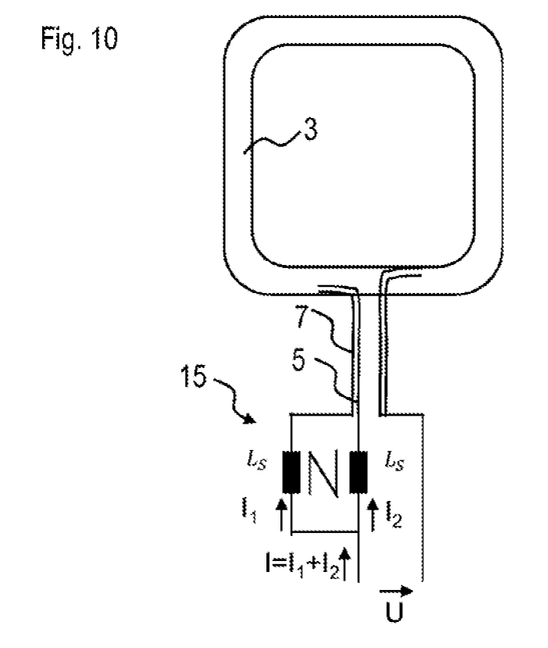
FIG. 10 is a view of the coil unit for inductively charging a vehicle in which two electrical lines are oppositely coupled.

FIG. 10 shows the coil unit 1, in which the number of electrical lines 5,7 is two and the additional inductance units $L_S$ of the two electrical lines 5,7 are oppositely coupled. The opposite coupling may be achieved for example by forming the two additional inductance units $L_S$ by way of two coils that have a common ferrite and that are oppositely wound.

Figure 11:
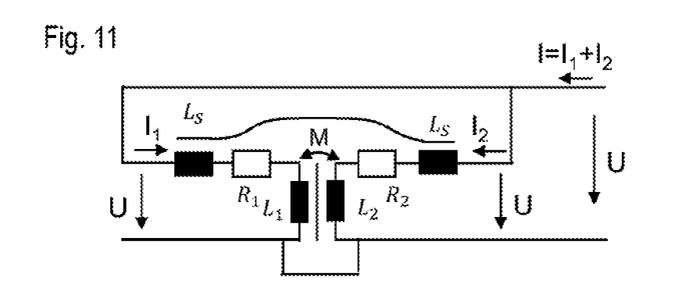
FIG. 11 is a view of a substitute model of the coil unit for inductively charging a vehicle in which two electrical lines are oppositely coupled.

This gives the substitute model of FIG. 11. The substitute model gives the following equation:

$$Z = \begin{bmatrix} L_1 + L_S + R_1 & M - L_S \\ M - L_S & L_2 + L_S + R_2 \end{bmatrix} \quad (10)$$

Under the assumption that $L=L_1=L_2=M(k=1)$, $k_S=1$ and $R=R_1=R_2$, this gives:

$$Z = \begin{bmatrix} L + L_S + R_1 & L - L_S \\ L - L_S & L + L_S + R_2 \end{bmatrix} \quad (11)$$

and with $L_A=(L+L_S)$ and $M_A=(L-L_S)$:

$$M = k_A\sqrt{(L+L_S)(L+L_S)} = k_A(L_S) = (L - L_S) \quad (12)$$

and therefore $$k_A = \frac{L - L_S}{L + L_S} \quad (13)$$

As may be seen from formula 13, in comparison with formula 8, the coupling of the two electrical conductors 5,7 is reduced to a greater extent by $L_S$. Smaller additional inductance units $L_S$ are therefore necessary to achieve the same effect.

Furthermore, the overall impedance is given for $L=L_1=L_2=M(k=1)$, $R=R_1=R_2$ by solving the equation system with a Z-matrix:

$$Z = L + R/2 \quad (14)$$

As may be seen, the overall resistance R is reduced by the parallel circuit. At the same time, the overall inductance L does not increase. The reactive power in the system thus does not rise.

Figure 12:
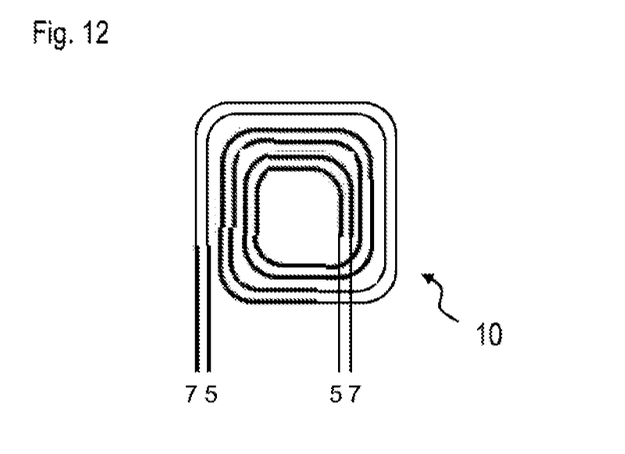
FIG. 12 is a view of a winding part of the coil unit.

FIG. 12 shows one example of a parallel-wound winding part 10 with two electrical conductors 5,7. Due to the planar winding, the two electrical conductors 5,7 have different diameters. As one of the electrical conductors 7 always runs on the outer side, this has a greater inductance and, due to the longer path, a greater resistance.

Figure 13:
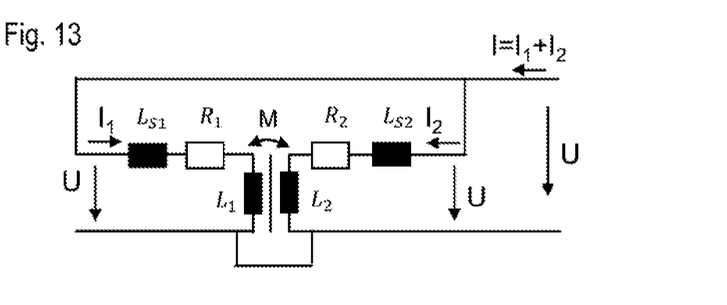
FIG. 13 is a view of a substitute model of the coil unit for inductively charging a vehicle.

Differently sized inductance units may compensate these differences between $L_1$ and $L_2$, as visible from the substitute model of FIG. 13:

$$L_{S1} + L_1 = L_{S2} + L_2 \quad (14)$$

In the same way, an additional resistor may adjust the value of $R_2$ to $R_1$.

As an alternative or in addition, use may be made of a common-mode choke, that is to say oppositely coupled additional inductance units $L_S$ as in FIGS. 10 and 11.

Figure 14:
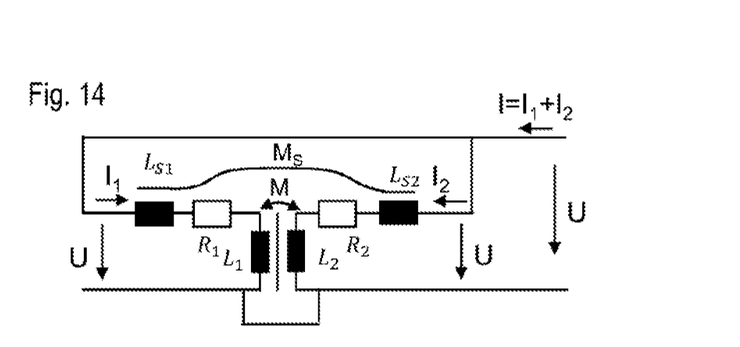
FIG. 14 is a view of a substitute model of the coil unit for inductively charging a vehicle.

This gives the following Z-matrix, as may be seen from the substitute model of FIG. 14:

$$Z = \begin{bmatrix} L_1 + L_{S1} + R_1 & M - M_S \\ M - M_S & L_2 + L_{S2} + R_2 \end{bmatrix} \quad (15)$$

In this case, the above-described differences may be compensated by way of the following equation:

$$L_1 + L_{S1} + R_1 = L_2 + L_{S2} + R_2 \quad (16)$$

Figure 15:
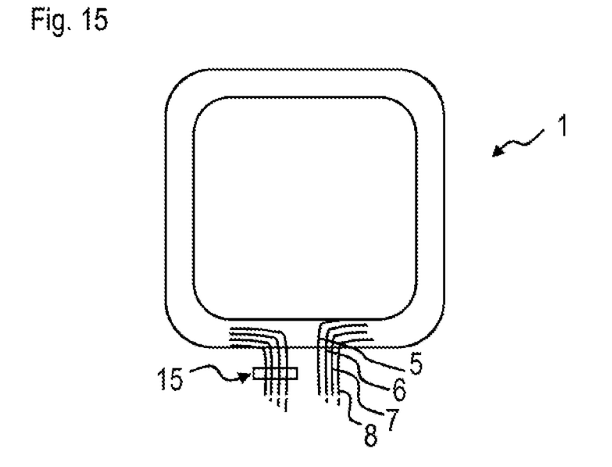
FIG. 15 is a view of the coil unit for inductively charging a vehicle.

In principle, any desired number of electrical conductors 5,7 may be used. The number 4 is illustrated by way of example in FIGS. 15, 16 and 17. The additive overall inductance of $L_S/n$ decreases with the number of individual lines. For a large n, the additive inductance is negligible.

Figure 16:
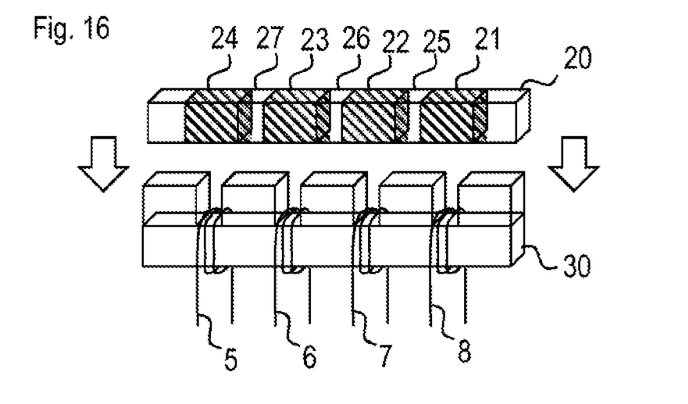
FIG. 16 is a view of the coil unit, wherein additional coils are wound around a common ferrite.
Figure 17:
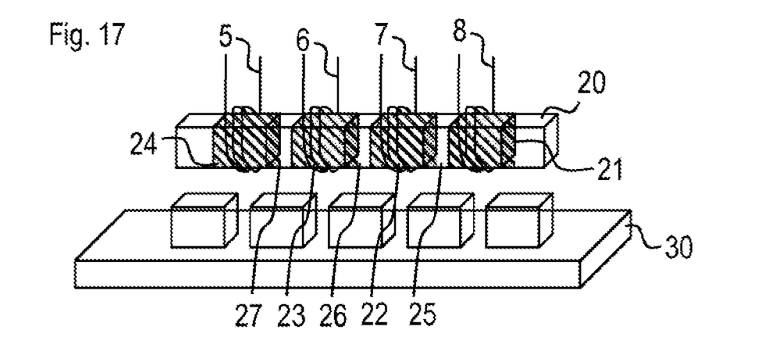
FIG. 17 is a view of the coil unit, wherein additional coils are wound around a carrier body.

FIGS. 16 and 17 show a system including a carrier body 20 and a ferrite 30. The carrier body 30 includes a number of ferrites 21, 22, 23, 24 that corresponds to the number of electrical lines 5, 6, 7, 8. Magnetically neutral carriers 25, 26, 27, 28, which may also be referred to as armatures, prevent the ferrites 21, 22, 23, 24 from magnetically coupling.

In FIG. 16, the additional coils of the electrical lines 5, 6, 7, 8 are wound around the common ferrite 30.

In FIG. 17, the additional coils of the electrical lines 5, 6, 7, 8 are respectively wound around the ferrites 21, 22, 23, 24 of the carrier body 20.

The air gaps may then be closed, as indicated by the arrows in FIG. 16.

The common ferrite 30 may be connected to a ferrite of the coil, that is to say for example to the ferrite 105 of the primary coil 103 or the ferrite 205 of the secondary coil 203, or it may be part of this ferrite 105, 205.

In summary, due to the number of at least two electrical lines 5, 6, 7, 8, a high current-carrying capacity is achieved since the current is distributed over the parallel electrical lines 5, 6, 7, 8. The additional inductance unit LS may contribute to the current being distributed evenly over the parallel electrical lines 5, 6, 7, 8. The number of electrical lines 5, 6, 7, 8 is in principle able to be selected freely, and as many electrical lines 5, 6, 7, 8 as desired may therefore be used in order to achieve a high current-carrying capacity.

LIST OF REFERENCE SIGNS

1 coil unit
3 coil
5,6,7,8 electrical lines
10 winding part
15 additional part
20 body
21, 22, 23, 24 ferrites
25, 26, 27, 28 magnetically neutral carriers
30 ferrite
100 ground unit
101 housing
103 primary coil
105 ferrite
200 vehicle unit
201 housing
203 secondary coil
205 ferrite
$L_S$ additional inductance unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coil unit for inductively charging a vehicle, comprising:
   a coil, wherein the coil comprises a plurality of windings of at least two electrical lines, wherein
   the at least two electrical lines are connected in parallel,
   each of the at least two electrical lines has a respective winding part and an additional part in which an additional inductance unit is arranged that has a prescribed electrical inductance that is 0.02 times, 0.04 times, 0.06 times, or 0.08 times an electrical inductance of each of the at least two electrical lines in the respective winding part,
   the at least two electrical lines are litz wires, and
   the additional inductance units of the at least two electrical lines have a common ferrite, but are oppositely wound.

2. The coil unit according to claim 1, wherein a number of electrical lines is two and the additional inductance units of the at least two electrical lines are oppositely coupled.

3. The coil unit according to claim 1, wherein the additional inductance unit is formed as a separate component.

4. The coil unit according to claim 1, wherein the additional inductance unit is formed by winding the respective electrical line so as to form an additional coil.

5. The coil unit according to claim 4, wherein the additional coils of the at least two electrical lines are wound around a common ferrite.

6. The coil unit according to claim 4, further comprising:
   a carrier body that has a number of ferrites that corresponds to a number of electrical lines, wherein a magnetically neutral carrier is in each case arranged between the number of ferrites and the additional coils of the electrical lines and each of the additional coils of the number of electrical lines wound around the respective ferrite.

7. The coil unit according to claim 1, wherein a number of electrical lines is two and electrical inductances of the two additional inductance units are prescribed such that it holds true that $L\_S1+L1=L\_S2+L2$, wherein L1 is an inductance of a first of the two additional inductance units, L2 is an inductance of a second of the two additional inductance units, L_S1 is an inductance in the winding part of an electrical line that has the first of the two additional inductance units and L_S2 is an inductance in the winding part of an electrical line that has the second of the two additional inductance units.

* * * * *